Nov. 18, 1924.
G. A. LOUGH
DRYING APPARATUS AND PROCESS
Filed May 10, 1921
1,516,444
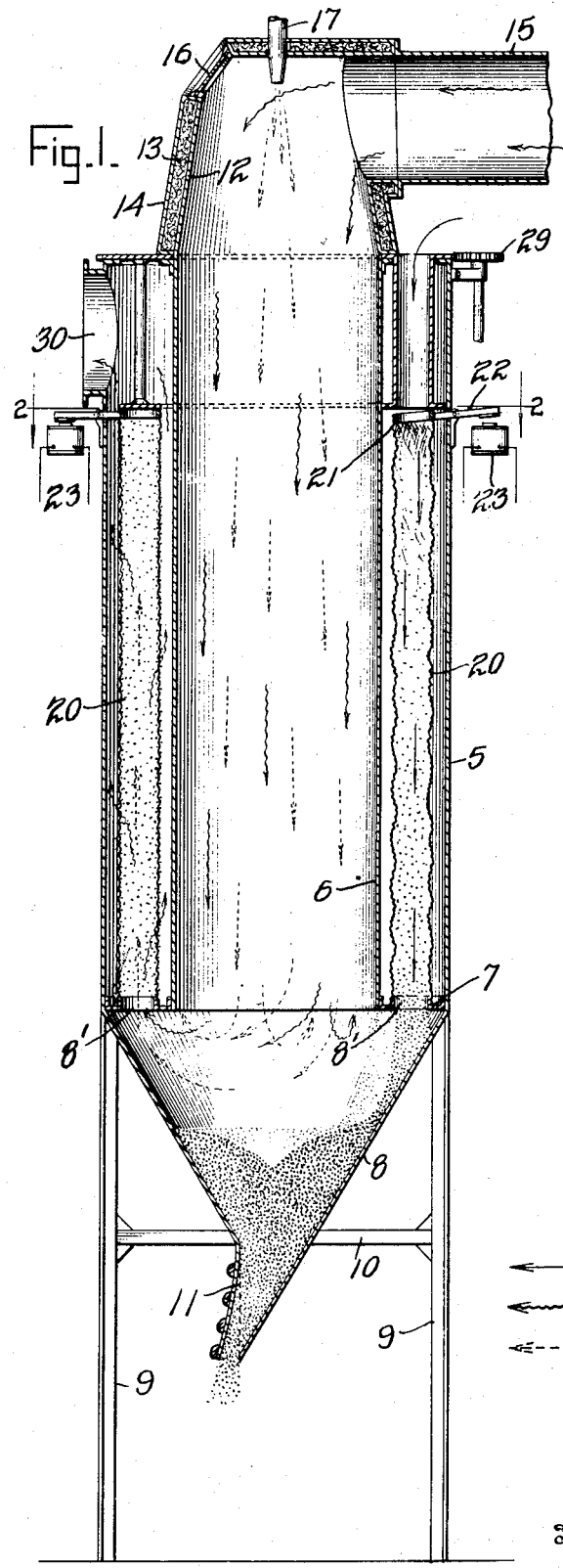
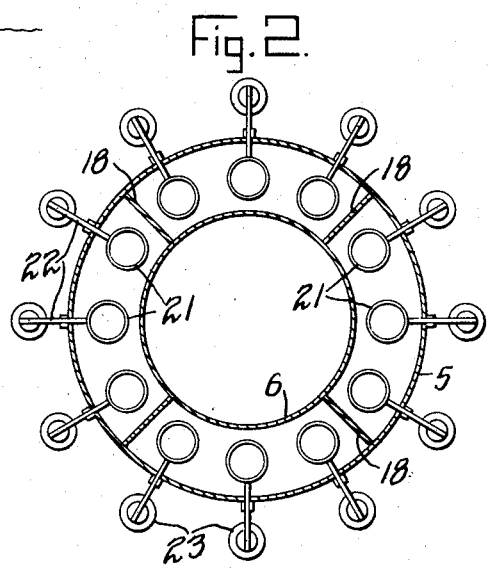
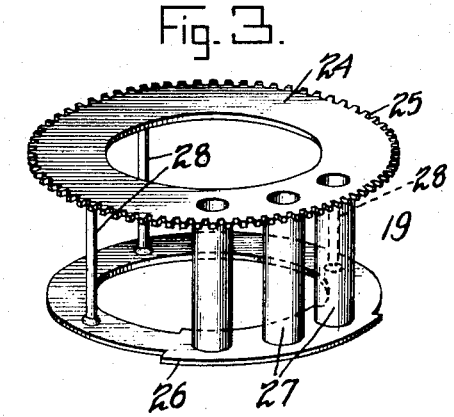
⟵——— COOL AIR
⟵∼∼∼∼ HEATED AIR
⟵- - - - - ATOMIZED MILK
Inventor
Gerald A. Lough
By *E. W. Bradford*
Attorney Patented Nov. 18, 1924.

1,516,444

UNITED STATES PATENT OFFICE.

GERALD A. LOUGH, OF PLAINFIELD, NEW JERSEY.

DRYING APPARATUS AND PROCESS.

Application filed May 10, 1921. Serial No. 468,368.

*To all whom it may concern:*

Be it known that I, GERALD A. LOUGH, a citizen of the Dominion of Canada, residing at Plainfield, in the county of Union and State of New Jersey, have invented certain new and useful Improvements in Drying Apparatus and Processes, of which the following is a specification.

My said invention relates to a spray drying device for drugs, chemicals, milk and other fluids or semi-fluids whereby the solid constituents can be separated from the liquid. It is an object of the invention to provide a device which can be made in small sizes to provide for the needs of drug manufacturers and others who have occasion to dry relatively small quantities of numerous materials.

It is also an object of the invention to provide such a device which shall be compact and efficient and yet simple in structure, comparatively inexpensive to install and not liable to get out of order.

Referring to the accompanying drawings, which are made a part hereof and on which similar reference characters indicate similar parts, Figure 1 is a vertical section of my device, Figure 2 a section on line 2—2 of Figure 1, and Figure 3 a perspective of a valve.

In the drawings reference character 5 indicates the outer shell of the device which is preferably cylindrical in form and 6 indicates an inner shell concentric with the first and extending upwardly beyond the shell 5. At their lower end the shells are connected by an annulus 7 having an annular series of apertures 8' with upwardly extending flanges about the apertures. The lower end of member 5 may be formed as a hopper 8 for collecting the evaporated material or the hopper may be formed separately and supported in any conveinent manner, the entire device being supported by posts 9 having braces 10. The lower portion of the hopper may be fixed to one or more of the braces 10. At its lower end the hopper has a gate 11 which may be flexible or hinged as desired and which is normally held in closed position by the suction in the drier but will open automatically when a sufficient weight of material has collected in the hopper, after which the material will be discharged into a barrel or other container placed below the hopper and the gate will again swing to closed position.

The shell 6 extends upwardly some distance above the upper end of shell 5 and may terminate in a tapered portion 12 or the tapered portion 12 may be formed separately if desired. An outer shell 14 is spaced from part 12 to provide a container for heat insulating material 13 and these parts with a lateral extension 15 form the upper end of the drier. A window 16 is provided in this part for purposes of inspection or for access to the interior as may be needed and one or more nozzles 17 are also provided at the apex of the device. These nozzles serve for spraying milk or other fluid or semi-fluid material into the current of hot air coming through the inlet 15. Various other means of producing a spray may be substituted for the nozzle shown at 17, this being illustrated merely as a conventional atomizing means.

The space between the shells 5 and 6 is divided into four compartments by a series of partitions 18, these partitions extending from wall to wall and from the annulus 7 up to the lower end of the valve 19 shown in detail in Figure 3. In each of these partitions there are shown three tubular screens 20 each being attached at its lower end to a flange about an opening 8' in annulus 7 and each being connected at its upper end to a ring 21 carried by a lever 22 pivoted on the outer shell 5. The screens are preferably made of cloth and are of small diameter, e. g., some four or five inches. Electromagnets 23 act on levers 22 to hold the screens normally straight as at the left-hand side of Figure 1. By energizing and de-energizing the magnets a shaking action may be given to the screens as indicated at the right-hand side of Figure 1. Above the screens and between the shells 5 and 6 is a valve 19 supported by flanges at the upper ends of the shells. The valve comprises an upper annulus 24 having gear teeth 25 about its outer edge, a lower annulus 26 and connecting means for the two. The connecting means comprises a series of three pipe sections 27 extending between annulus 24 and a wide portion of annulus 26, and a series of solid pins or rods 28 extending between annulus 24 and a narrower portion of annulus 26. It will be seen that the wider portion of the annulus when it is above one of the compartments between shells 5 and 6 will close the same at the top as at the right-hand side of Figure 1 while the narrower portion will leave a space adjacent each shell as at the left-hand side of Figure 1. An intermittently operated gear 29 driven by any suitable mechanism engages the teeth 25 and serves to impart intermittent rotary movements to the valve, each intermittent movement extending through an arc of 90°.

An outlet passage 30 is provided in the shell 5 and is connected to any suitable means for creating suction through the drier.

In the operation of my device suction being created by means connected to the outlet 30 heated air is drawn in at 15 and liquid is sprayed into the current of air at 17, the course of the air being indicated by wavy arrows and that of the spray by dotted arrows. It will be seen that the air at its highest temperature will contact with the liquid where the spray is densest and where by reason of the rapid evaporation the solid constituents are least likely to suffer from high temperatures. The evaporation of the greater portion of the liquid contents takes place almost instantaneously as the liquid is sprayed into the current of air and may continue down through the chamber. The greater part of the solid constituents will be deposited at the bottom which is also the coolest portion of the container while such solids as are not deposited here will be carried up by the air current through the annular series of screens, the current being now divided into a plurality of branches corresponding to three-fourths of the total number of screens in the embodiment of the invention here illustrated and the material being deposited in the screens in powdered form as the air passes through their walls. It will be remembered that the upper end of one compartment is closed by the wide part of annulus 26, thus preventing the suction in the chamber of valve 19 from acting to draw air through the screens in the compartment. The vaporizing air current passes up through the remaining screens, out through their walls, and thence to the air outlet passage 30 through the valve 19. These screens are closed at their upper ends at this time by the narrow part of annulus 26.

The solids in the form of powder, separated from the air current by the screens will for the most part fall into the hopper. In order to clear the screens at intervals and also to prevent clogging of the same I provide means for shaking the screens which are beneath the wide portion of annulus 26. Such means may include any conventional device for successively energizing and de-energizing the corresponding electro-magnets 23, the remaining electro-magnets being constantly energized so long as an air current is passing upward through the screens. During the time that the screens of a set are being shaken a current of outer air, indicated by solid arrows, will be drawn down through each tube 27 and screen 20 of that set to assist in carrying the powder down into the hopper 8. The process is a continuous one, the sets of screens being successively cleared of accumulated powder and then placed in action again.

Having thus fully described my said invention, what I claim as new and desire to secure by Letters Patent, is:

1. A spray drier for separating solids from liquids comprising a passageway for air, means to spray liquid into the current of air adjacent the point of admission, a stationary tubular screen through the walls of which the current subsequently passes to separate the evaporated materials therefrom, and means permitting a reverse current of air to pass through the tubular screen at intervals to free it from particles of solid matter adhering thereto, substantially as set forth.

2. A spray drier comprising concentric upright cylinders, an annular series of tubular screens between them, whereby a current of air may pass through the inner cylinder and thence through the screens, means adjacent the point of admission of air to project a spray of liquid into the current, means at the lower end of the drier to collect the dried residue of solids, means to cut off the air-current successively from the screens to render them inactive and means to shake the screens when the current is cut off, substantially as set forth.

3. A spray drier comprising concentric upright cylinders, an annular series of tubular screens between them, whereby a current of air may pass through the inner cylinder and thence through the screens, means adjacent the point of admission of air to project a spray of liquid into the current, means at the lower end of the drier to collect the dried residue of solids, means to cut off the air-current successively from the screens to render them inactive, means to shake the screen when the current is cut off, and means for directing a reverse current of air through said inactive screens, substantially as set forth.

4. A spray drier comprising an interior casing provided with a downward passage for heated air, an exterior casing concentric with the first forming a chamber concentric with the main chamber and a plurality of screens in said chamber, an exit passage above said screens and a valve between the screens and the exit passage said valve controlling the passage of air through each of said individual screens, substantially as set forth.

5. A spray drier comprising an internal casing, an external casing, a plurality of tubular screens in the space between the casings, whereby a current of air may pass through the internal casing and branch currents in the screens, a valve between the screens and the exit passage for said current, said valve adapted to interrupt the branching currents in successive screens and to direct a reverse current to pass through said screens, substantially as set forth.

6. A spray drier comprising an internal casing, an external casing, a plurality of tubular screens in the space between the casings, whereby a current of air may pass through the internal casing and branch currents in the screens, an exit passage for the air, a valve between the screens and the exit passage said valve being adapted to interrupt the branching currents in the circuit of screens and to direct a reverse current through said screens, means for normally maintaining the screens taut in a vertical position, and means for shaking the screens in the direction of their length while the reverse current is passing through them, substantially as set forth.

7. In a spray drier, an annular chamber, a plurality of tubular upright screens in said chamber, means to admit air to the chamber, a suction opening for causing a current of air to enter at one end of each tubular screen and pass through the walls thereof, and a rotary valve at the other end of the screens adapted to interrupt the current in successive screens of the series, substantially as set forth.

8. In a spray drier, an annular chamber, a plurality of tubular upright screens in said chamber, means to admit air to the chamber, a suction opening for causing a current of air to enter at one end of each tubular screen and pass through the walls thereof, a rotary valve comprising opposed annular plates and spacers between the plates some of said spacers being in the form of tubes adapted to register with said tubular screens to permit passage of a reverse current through said screens, and gearing for rotating said valve, substantially as set forth.

9. A process of separating solids from liquids comprising, creating a curent of heated air, projecting a spray of liquid into the current, dividing the main current into a plurality of branches, passing each branch current through the walls of a tubular screen, and reuniting the branch currents into a current jacketing the first-named current to conserve the heat of the same, substantially as set forth.

10. A process of separating solids from liquids comprising, creating a current of heated air, projecting a spray of liquid into the current, dividing the main current into a plurality of branches, and passing the branch currents separately through the walls of an annular series of tubular screens, and reuniting the branch currents into a current jacketing the first current, substantially as set forth.

11. A process of separating solids from liquids comprising creating a current of air, projecting a spray of liquid into the current, dividing the main current into a plurality of branches, passing the branch currents separately through the walls of an annular series of tubular screens, reuniting the branch currents into a current jacketing the first current, and cutting off the branch currents in progressive succession, substantially as set forth.

12. A process of separating solids from liquids comprising creating a current of air, projecting a spray of liquid into the current, dividing the main current into a plurality of branches, passing the branch currents separately through the walls of an annular series of tubular screens whereby the branch currents are reunited into a current jacketing the first current, cutting off the branch currents in progressive succession, and shaking the screens in the direction of their length while the air current is cut off, substantially as set forth.

13. A process of separating solids from liquids comprising creating a current of air, projecting a spray of liquid into the current, dividing the main current into a plurality of branches, passing the branch currents separately through the walls of an annular series of tubular screens, reuniting the branch currents into a current jacketing the first current, cutting off the branch currents in progressive succession, shaking the screens in the direction of their length while the air current is cut off, and simultaneously passing a reverse current of air therethrough, substantially as set forth.

14. A spray drier for separating solids from liquids comprising a passageway for air, means to spray liquid into the current of air adjacent the point of adm'ssion, a stationary tubular screen through the walls of which the current subsequently passes to separate the evaporated materials therefrom, a valve normally closing one end of the screen and means for opening the valve to permit a reverse current of air to pass from end to end through the tubular screen at regular intervals to free it from particles of solid matter adhering thereto, substantially as set forth.

15. In a spray drier, a casing having a central vertical conduit, a port for admission of air to the upper end of the same, means for spraying a liquid into said conduit, an exhaust port for air, a series of stationary vertical tubular screens arranged about said conduit leading to said exhaust port, a hopper at the lower end of the casing extending underneath the conduit and the tubular screens to receive the dried residue of the liquid by gravity and means for shaking the screens, substantially as set forth.

16. In a spray drier, a series of tubular screens, a desiccating chamber communicating with the screens in said series, means to admit air to the chamber, liquid spraying means adjacent to the air admitting means, a common exit passage communicating with said screens adapted to be connected to a suction pump, and means revolving relatively to the series of screens for cutting off the current successively from each of said screens in regular order, substantially as set forth.

17. A spray drier comprising concentric upright cylinders, an annular series of tubular screens between them whereby a current of air may pass through the inner cylinder and thence through the screens, a port for admitting air near the upper end of the drier, means adjacent to said port for projecting a spray of liquid into the entering current of air, means at the lower end of the drier to collect the dried residue of solids, means rotatable about the inner cylinder to cut off the air-current successively from the screens to render them inactive, and means to shake the screens when the current is cut off, substantially as set forth.

18. In a spray drier, a casing having a central vertical conduit, a port for admission of air to the upper end of the same, means for spraying a liquid into said conduit, an exhaust port for air, an annular series of stationary vertical tubular screens arranged about said conduit leading to said exhaust port, and a hopper at the lower end of the casing extending underneath the conduit and the tubular screens to receive the dried residue of the liquid simultaneously from said conduit and said tubular screens, substantially as set forth.

19. A spray drier comprising concentric upright cylinders, an annular series of tubular screens between them whereby a current of air may pass through the inner cylinder and thence through the screens, a port for admitting air near the upper end of the drier, means adjacent to said port for projecting a spray of liquid into the entering current of air, means at the lower end of the drier to collect the dried residue of solids, and means rotatable about the axis of the cylinders to shake the screens in succession, substantially as set forth.

In witness whereof, I have hereunto set my hand and seal at Washington, District of Columbia this 2nd day of May, A. D. nineteen hundred and twenty-one.

GERALD A. LOUGH. [L. S.]

Witnesses:
    FRANK W. DAHM,
    MARIE A. SHAW.